Patented Sept. 19, 1922.

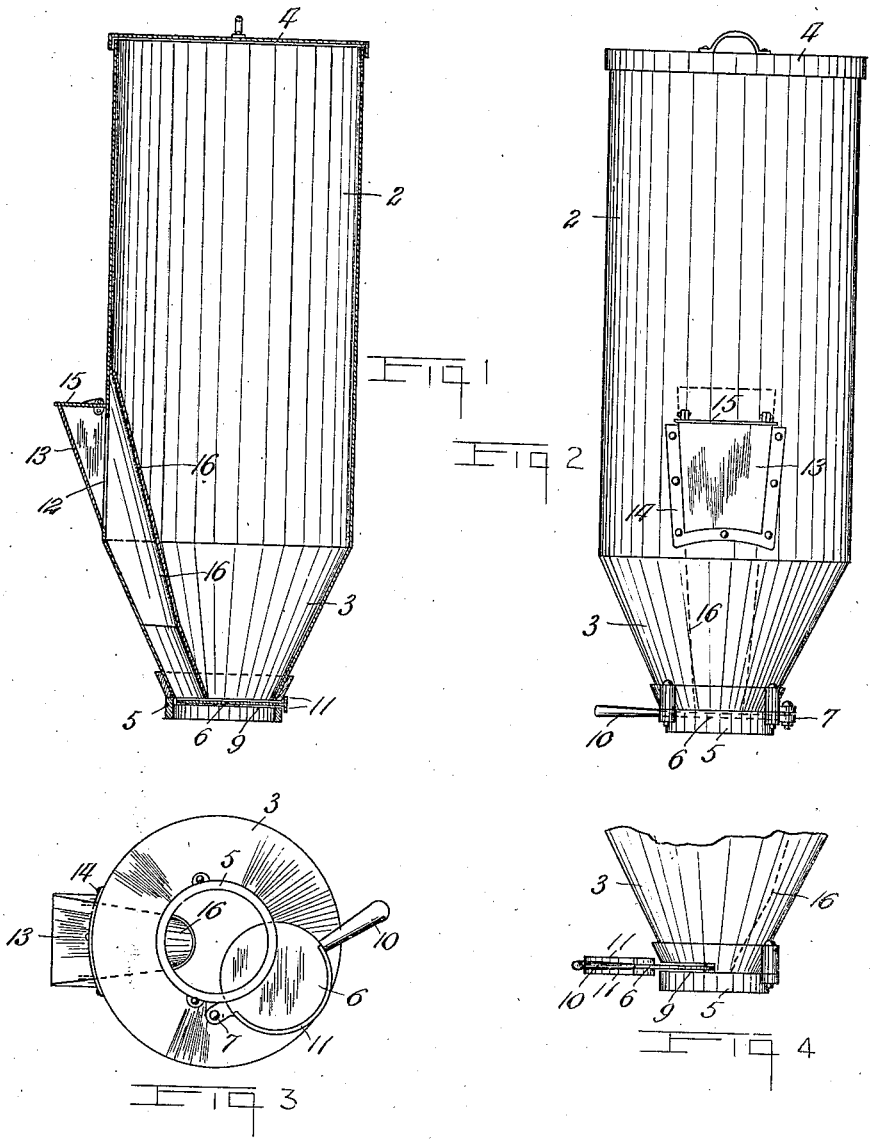

1,429,260

UNITED STATES PATENT OFFICE.

IRWIN J. VAN FLEET, OF HAMILTON, ONTARIO, CANADA, ASSIGNOR TO WILLIAM MATCHES, OF HAMILTON, ONTARIO, CANADA.

FOOD DISPENSER.

Application filed October 24, 1921. Serial No. 509,925.

*To all whom it may concern:*

Be it known that IRWIN J. VAN FLEET, a subject of the King of Great Britain, residing at Hamilton, in the county of Wentworth and Province of Ontario, Canada, has invented certain new and useful Improvements in Food Dispensers, of which the following is a specification.

My invention relates to improvements in hoppers and dispensers for foods such as tea, coffee, spices, cereals, grains, and the like, for use in stores, wholesale establishments, warehouses and all places where foods of certain classes are packaged.

The invention consists essentially of a bulk container provided with a hopper and a discharge or shut-off valve, an auxiliary hopper communicating with a port in the front of the container, and a chute formed within the container and hopper leading from the port to said shut-off valve.

The primary object of this invention is to provide a suitable and convenient device for dispensing merchandise of the class specified, and a further object is to provide means in a dispenser whereby any excess contents emitted through the discharge nozzle may be conveniently returned to the shut-off valve so as to be discharged along with the bulk contents of the dispenser during a subsequent operation, and still further to provide means that will prevent the auxiliary hopper from becoming clogged by the bulk contents.

Another object is to provide a device of the class described which will be simple, durable, efficient in operation, and inexpensive to manufacture.

These, together with other objects, may be attained by the construction, combination, and arrangement of the parts as will be hereinafter more fully described, illustrated in the accompanying drawing, and pointed out in the claims hereunto appended.

Referring to the drawing:

Figure 1 is a cross-sectional side elevation of the device;

Figure 2 is a front elevation;

Figure 3 is a bottom view showing the shut-off valve in open position; and,

Figure 4 is a side elevation of the hopper section showing the shut-off valve in open position.

Similar reference characters refer to similar parts throughout the several views.

The bulk container which is preferably cylindrical in form is indicated by 2, the lower end of which communicates with a hopper 3 which forms an integral part thereof. The said container is provided wtih a suitable type of lid or cover 4 of any preferred design, and may be suitably suspended or supported in a perpendicular position by preferred means.

A discharge nozzle 5 through which the contents of the container and hopper are adapted to gravitate, is attached to the lower and small end of the hopper 3. The discharge or shut-off valve comprises a horizontally disposed circular plate or knife disc 6 having hinged connection 7 on the discharge nozzle 5, and is adapted to operate in an annular slot 9 in said nozzle. This disc is provided with a handle 10 for the manipulation thereof, and opposed annular stop flanges 11 for the purpose of limiting the closing movement of the plate.

A rectangular port 12 is formed in the front of the container 2, and an auxiliary hopper 13 is provided having flanges 14 which are riveted, for example, to the container, and a hinged lid 15.

A chute 16 is formed on the interior of the container 2 and hopper 3, communicating with the auxiliary hopper 13 by means of the port 12, and extending downwardly to the lower termination of the hopper 3.

The purpose of the invention is performed as follows:—

A receptacle, such as a paper bag for example, is positioned beneath the discharge nozzle 5, and a quantity of the contents of the container and hopper proportionately near to the required amount is permitted to graviate into the receptacle by opening the valve. Subsequently to weighing or measuring there is usually found to be some excess food which must necessarily be returned. This is accomplished through the auxiliary hopper 13 and chute 16 wherein the returned food remains until such time as the operation is repeated.

The advantage attained in the provision of the chute 16 is apparent in that if the same were not provided the bulk contents of the container would block or choke the port 12 and in fact would partially fill the auxiliary hopper 13, rendering it of little value.

Having now fully described my invention, what I claim and desire to secure by Letters Patent, is:—

1. In a device of the class described, the combination with a hopper having a port in the side thereof, of a chute formed on the interior of said hopper and extending downwardly from said port to the discharge end of the hopper, and a shut-off valve normally closing the discharge ends of the hopper and chute.

2. In a device of the class described, the combination with a hopper having a port in the side thereof, of a chute formed on the interior of said hopper and extending downwardly from said port to the discharge end of the hopper, a shut-off valve normally closing the discharge ends of the hopper and chute, and an auxiliary hopper secured externally of the principal hopper and communicating with said chute by means of said port.

3. In a device of the class described, the combination with a hopper having a port in the side thereof, of a chute formed on the interior of said hopper and extending downwardly from said port to the discharge end of the hopper, a nozzle on the discharge end of said hopper, and a shut-off valve in said nozzle.

4. In a device of the class described, the combination with a container provided with a hopper, said container having a port in the side thereof, of a chute formed on the interior of said container and hopper and extending from said port to the discharge end of the hopper, a shut-off valve normally closing the discharge ends of the hopper and chute, and an auxiliary hopper secured externally of said container and communicating with said chute by means of said port.

5. In a device of the class described, the combination with a container provided with a hopper, of a shut-off valve, an auxiliary hopper communicating with a port in the side of the container, and a chute formed within the container and hopper leading from said port to said shut-off valve.

In testimony whereof I have affixed my signature.

IRWIN J. VAN FLEET.

Witnesses:
H. G. HENDRY,
F. D. EARLE.